Feb. 13, 1923.
A. KINGSBURY ET AL.
BEARING.
FILED APR. 5, 1916.
1,444,839.
2 SHEETS—SHEET 1.
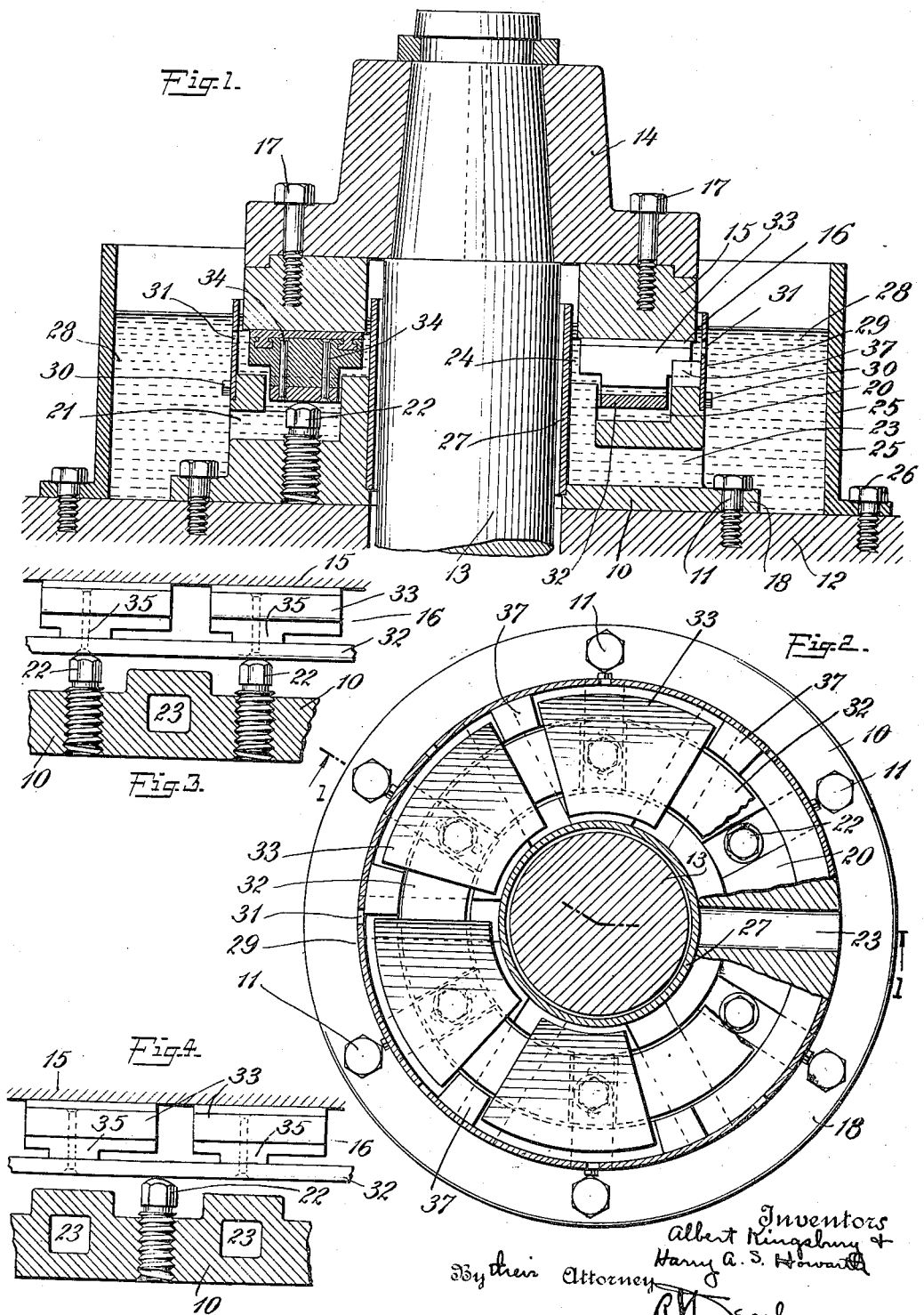

Feb. 13, 1923.
A. KINGSBURY ET AL.
BEARING.
FILED APR. 5, 1916.
1,444,839.
2 SHEETS—SHEET 2.
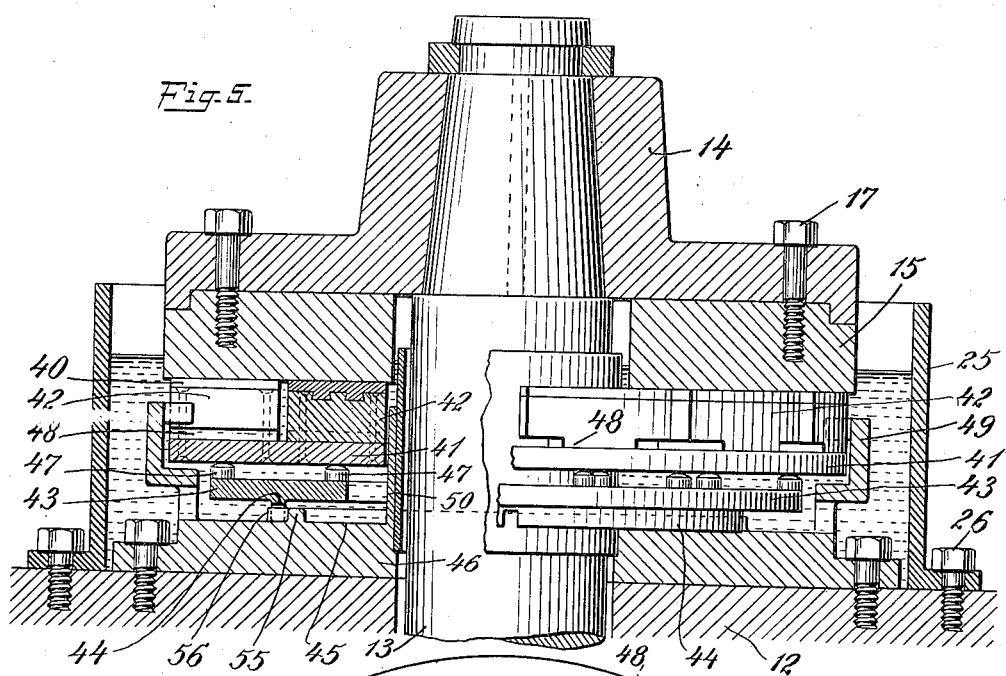
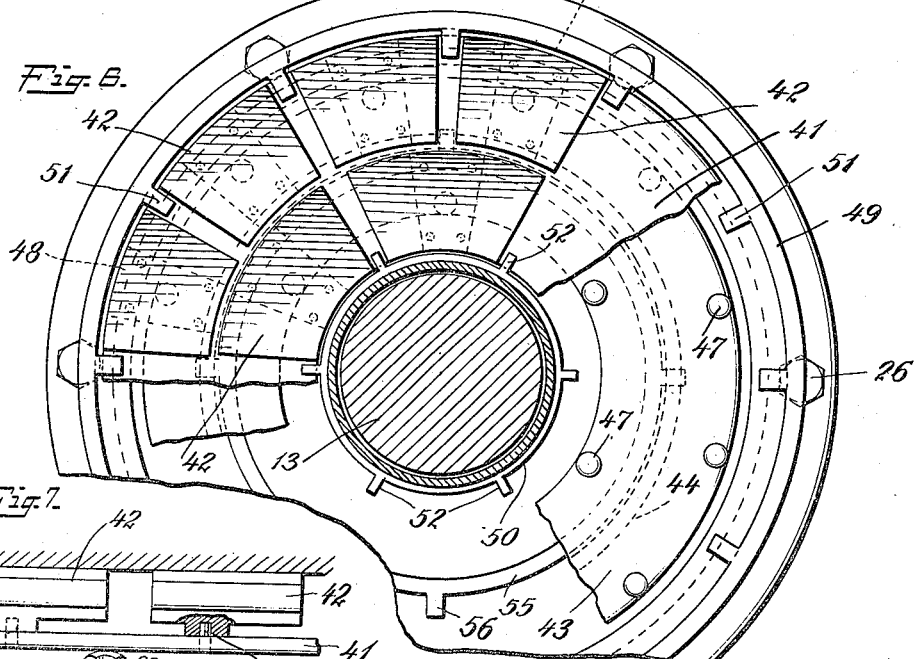
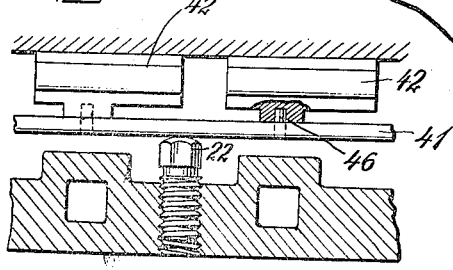
Inventors
Albert Kingsbury &
Harry A. S. Howarth
By their Attorney Patented Feb. 13, 1923.

1,444,839

UNITED STATES PATENT OFFICE.

ALBERT KINGSBURY AND HARRY A. S. HOWARTH, OF PITTSBURGH, PENNSYLVANIA; SAID HOWARTH ASSIGNOR TO SAID KINGSBURY.

BEARING.

Application filed April 5, 1916. Serial No. 89,001.

*To all whom it may concern:*

Be it known that we, ALBERT KINGSBURY and HARRY A. S. HOWARTH, citizens of the United States, and residents of Pittsburgh, Allegheny County, and State of Pennsylvania, have invented certain new and useful Improvements in Bearings, of which the following is a specification, reference being had to the accompanying drawings, forming a part thereof.

Our invention relates to bearings, and has special reference to thrust bearings which comprise tiltingly supported bearing members or shoes.

One object of our invention is to provide a unitary structure including a plurality of relatively rigid portions which constitute bearing shoes and are adapted to act like the independent tiltably mounted shoes of the inventions covered by patents previously granted to Albert Kingsbury; for example, see Patent No. 947,242 granted January 25, 1910, and Patent 1,117,499 granted November 17, 1914.

Another object of our invention is to provide a flexible bearing member having its bearing surface divided into a plurality of segments which are flexibly connected by said member, and relatively rigid means for supporting said member at distributed points to effect an equitable distribution of the bearing pressure among said segments.

Another object of our invention is to provide a bearing of the aforesaid character that shall be simple and durable in construction and that shall be adapted to effectively and automatically maintain a film of lubricating fluid between the bearing surfaces.

Other objects and advantages of our invention will be set forth hereinafter, and in order that our invention may be thoroughly understood we will now proceed to describe the same in the following specification and then point out the novel features thereof in appended claims.

The invention is capable of receiving a variety of mechanical expressions some of which are shown on the accompanying drawings, but it is to be expressly understood that the drawings are for the purpose of illustration only, and are not to be construed as a definition of the limits of the invention, reference being had to the appended claims for that purpose.

Referring to the drawings:

Figure 1 is a sectional elevation, taken on the line 1—1 of Figure 2, of a bearing embodying our invention.

Figure 2 is a plan view of the same bearing with certain of the parts broken away and shown in section.

Figure 3 is a sectional view developed into a single plane and showing a portion of the bearing member in elevation.

Another arrangement which also embodies our invention is shown in Figure 4 which corresponds to Figure 3.

Figure 5 is a partially sectional elevation of another structure which embodies our invention and which comprises a bearing member including concentric rows of bearing segments or shoes.

A plan view of the same structure, with certain of the parts broken away, is shown in Figure 6.

Figure 7 is a view, corresponding in general to Figure 4, and showing another embodiment in which the shoes are removably mounted on the ring instead of riveted thereto.

In the form shown in Figures 1, 2 and 3 an annular base 10 is secured by bolts 11 or other suitable means to a frame or foundation 12, and a shaft 13 which extends through a suitable opening in the frame and through the annular base carries a thrust block 14 which is keyed or affixed to the shaft 13 by any suitable means, and one of the bearing members 15, which is hereinafter designated the thrust collar, is secured to the block 14 by bolts 17 or other suitable means.

The base 10 has a flange 18 through which the bolts 11 extend, and is provided with an annular groove 20 in its upper surface. It is further provided with radial recesses or pockets 21 which open into the bottom of the annular groove 20 and they each permit the introduction of a wrench for the purpose of turning one of a series of adjusting screws 22. Lubricating fluid passages 23 are also provided in the base 10 and extend radially through the base as shown in Figure 1 and axially upward, opening into the annular space 24 within the bearing members.

An outer wall or flange 25 surrounds the bearing and is secured to the frame or foundation 12 by suitable means and bolts 26. A sleeve 27 surrounds the shaft 13 and is attached to the base 10 so that it cooperates with the wall or flange 25 in providing a fluid containing reservoir 28. We also prefer to utilize a baffle plate 29 which has the form of a cylinder secured to the base 10 by bolts 30 and which extends upwardly from the base beyond the plane of the bearing surfaces and is perforated opposite the bearing surfaces as indicated at 31.

The bearing member 16 with which our invention is particularly concerned comprises in the form illustrated a resilient ring 32 which is disposed in the annular groove 20 of the base and rests upon the spherically-headed adjusting screws 22 and a plurality of bearing shoes 33 which are attached to the resilient ring 32 by rivets 34 or some other suitable means.

The shoes 33 as clearly shown in Figure 3 are each provided with a projection or rib 35 which extends radially across the bottom of the shoe and engages the adjacent surface of the ring 32 so that it serves to space the body of the shoe from the ring.

The projection or rib 35 may be located in the center of the bottom of the shoe or may be offset to one side of the center as shown in Figure 3. The offset arrangement we consider preferable provided the bearing is intended to operate only in one direction of rotation but the rib is preferably located in the center when the bearing is adapted to rotate in either direction.

It is evident that the bearing member 16, which is composed of a plurality of bearing segments connected by the resilient ring, is a unitary structure and may be formed of integral instead of attached members so as to provide a flexible bearing member the surface of which is formed to constitute a plurality of bearing segments.

The adjusting screws 22 may be located as shown in Figure 3 so that each screw is directly under the rib 35 which joins the shoe to the ring. This arrangement is, however, not essential to our invention and the arrangement illustrated in Figure 4 may be found preferable in some cases. In the form here shown, the adjusting screws 22 engage the ring 32 at a point between the shoes, preferably midway between the ribs 35 of adjacent shoes. In this arrangement the ring on account of its flexibility serves to a certain extent as an equalizer to uniformly distribute the pressure upon the several shoes, but the primary object of the resilient ring in each embodiment is to permit the shoes to tilt individually when the bearing is in operation to automatically provide for the continuous wedging of lubricating fluid between the bearing surfaces in accordance with the principles of the Kingsbury bearings.

In order to prevent the bearing member 16 from turning with the thrust collar 15, the base 10 is provided with a plurality of upwardly extending lugs or projections 37 which extend between adjacent shoes as shown in Figure 2. They do not, however, interfere with the tilting of the shoes.

The adjusting screws 22 are solely relied upon in the structure of Figure 3 to distribute the pressure upon the several shoes, the screws being set with this in view, but in the arrangement of Figure 4, it is only necessary to set the screws so as to roughly equalize the pressure on the several shoes, the resiliency of the ring as already pointed out permitting the equalization of pressure to be automatically effected by the yielding action of the ring.

Spring supports such as those shown in the Kingsbury Patent 1,117,499 hereinbefore referred to, or other equivalent resilient means, may be substituted for the adjustable studs 22, and be utilized to assist in the equalization of the pressure on the bearing segments or shoes. One form of such resilient support is shown in Figures 5 and 6, to which reference may now be had, like parts being designated by the same reference characters in all the figures.

In this construction the thrust collar 15 instead of cooperating with the member 16 cooperates with a member 40 which is composed of a flexible ring 41 corresponding to the ring 32 and bearing shoes 42 which correspond to the shoes 33. The shoes 42 however are arranged in two concentric rows, the arrangement being specially desirable for very heavy loads. Each of the shoes is attached to the ring 41 in substantially the same manner as the shoes 33 are attached to the ring 32 but there are preferably twice as many shoes in the outer row as in the inner. A radial line extending through the supporting rib of one of the shoes of the inner row also preferably extends between adjacent shoes of the outer row as shown in Fig. 6.

The member 40, instead of being comprised of a flexible ring and attached shoes, may be integral and in any event it constitutes a unitary structure of flexibly connected bearing segments which corresponds to the unitary structure 16

The ring 41 is mounted on a resilient equalizing ring 43 having a central annular rib or projection 44 which rests upon the top surface 45 of a base 46. This equalizing ring is formed of resilient material and is mounted in such manner that it constitutes a spring support for the shoes and may be flexed readily. It may be dished or distorted also from a plane ring to a frusto-conical member of low altitude on account of the position of the rib 44 which constitutes an annular axis about which the distortion takes place.

Upon the upper surface of the resilient equalizing ring 43 are a plurality of projections 47 having spherically curved top surfaces upon which the flexible ring 41 of the bearing member 40 is mounted. The projections, as shown in Figures 5 and 6, engage the ring directly below the ribs 48 of the shoes, but they may be so located as to engage the flexible ring 41 between the shoes if desired, thereby still further increasing the flexibility of the structure. The resilient ring performs the function of equalizing the pressure between the two concentric sets of shoes as well as of equalizing the pressure upon the shoes of each set.

While we have shown the bearing member which comprises the flexible portion and the shoes or segment portions as a part of the stationary element of the bearing, this member may obviously be a part of the rotating member if desired, in which case the thrust collar would be mounted upon the stationary instead of upon the rotating part.

As shown in Figure 7, the shoes 42 instead of being riveted or otherwise affixed to the ring 41 may be removably mounted thereon; for example, the ring may be provided with suitably-located, upwardly-extending dowel pin projections 46, the shoes having correspondingly located recesses to cooperate with the dowel pins.

As clearly shown in Figure 6, the stationary base has angular projections 49 and 50 from which project lugs 51 and 52. These lugs are located and spaced so as to extend between the shoes of the respective rows, and thus prevent their rotation.

The equalizer 43 is held in position and prevented from rotating by a rib 55 on the base which cooperates with rib 44 of the equalizer and is provided with one or more lateral projections or lugs 56 which extend through notches in the rib 44.

The ring 41 may, of course, be held against rotation in any other suitable manner, and it is obviously not essential to have means for holding the shoes individually, provided the shoes are affixed to the ring or the segments form integral parts of the ring.

While the embodiments illustrated have been described with considerable particularity, it is to be expressly understood that the invention is not limited thereto, as changes may be made in the details of construction, proportion and arrangement of parts, certain features used without features thereof, and various other embodiments, some of which will now readily suggest themselves to those skilled in the art, be constructed within the spirit and scope of our invention, and we intend that only such limitations be imposed as are indicated in appended claims.

The yielding or resilient support for the flexible bearing member is not claimed specifically herein, claims including a yielding or resilient support for the flexible bearing member being presented in our application Ser. No. 188,724, filed August 29, 1917, for "Bearings" which is a division of this application.

What we claim is:

1. A thrust bearing comprising an annular member composed of a resilient ring with a plurality of shoes secured thereto and having spacing projections to separate the body of the shoes from the ring.

2. A thrust bearing comprising a base, a plurality of adjusting screws extending therefrom, a resilient ring mounted on the adjusting screws, and a plurality of bearing shoes mounted upon the ring.

3. A thrust bearing comprising a base, a plurality of adjusting screws extending therefrom and uniformly spaced thereon, a resilient ring mounted on the adjusting screws, and a plurality of bearing shoes mounted upon the ring.

4. A thrust bearing comprising a base, a plurality of adjusting screws extending therefrom and uniformly spaced thereon, a resilient ring mounted on the adjusting screws, and a plurality of bearing shoes mounted upon the ring directly above the adjusting screws.

5. A thrust bearing comprising a base, a plurality of adjusting screws extending therefrom, a flexible ring mounted on the screws, and a plurality of bearing shoes associated with the flexible ring, the said screws and ring being adapted and arranged to permit the tilting of the shoes by the resilient distortion of the flexible ring.

6. A bearing member comprising a plurality of resiliently connected portions constituting a series of relatively-rigid segment bearing surfaces, the said portions being adapted to be tilted slightly out of the common segment bearing plane when the bearing member is in use.

7. A bearing member comprising a plurality of resiliently connected relatively-rigid portions having segmental bearing surfaces, the said portions being mounted to be tilted out of a common plane by the wedging action of the lubricating fluid when the bearing member is in use.

8. In a thrust bearing, the combination of a bearing member comprising a plurality of resiliently connected portions having segmental bearing surfaces, and adjustable supports therefor, the parts being arranged and adapted to permit the segmental bearing portions to be tilted out of the common plane by the wedging action of the lubricating fluid when the bearing member is in use.

9. In a bearing, the combination of a bearing member comprising a plurality of relatively rigid segmental bearing portions with interposed resilient connecting portions, and means for supporting the bearing member to permit the tilting of the segmental bearing portions.

10. A bearing comprising a flexible member having a bearing surface divided into segments, and relatively-rigid supporting means cooperating therewith to permit the segments to tilt both radially and tangentially when the bearing is in operation.

11. A thrust bearing comprising in combination, a thrust collar, a flexible member provided with a series of segmental bearing surfaces engaging with said collar, means whereby oil may be supplied to the bearing surfaces and relatively-rigid supporting means cooperating with the flexible member to permit the flexing thereof by the action of the oil when the bearing surfaces are in relative rotation.

12. In a thrust bearing the combination of a thrust bearing member comprising an annular resilient ring portion with a plurality of bearing shoes mounted thereon, and a series of separated supports for the said member.

13. A thrust bearing comprising a base having an annular groove therein, and a bearing member consisting of a resilient ring disposed in the said groove and a plurality of bearing parts having projections extending into the groove and fixed to the ring part therein.

14. A thrust bearing comprising a base, a flexible ring mounted thereon and a plurality of T-shaped bearing shoes mounted on the ring at the base of the T, the ring and the attached shoes constituting a unitary bearing member.

15. A thrust bearing comprising an annular member having a series of separated supports, a resilient ring mounted on said supports and a plurality of bearing shoes mounted on the ring and constituting therewith a substantially unitary bearing member.

16. A thrust bearing comprising a supporting member provided with a plurality of projections, a resilient ring mounted on the said projections, and a plurality of bearing shoes associated with the resilient ring, the said ring being adapted by reason of its flexibility to permit the tilting of the shoes with respect to the ring supports.

17. In a bearing, the combination of a base, a flexible annular bearing member and relatively-rigid spaced supporting means cooperating with said bearing member for equitably distributing the load over the engaging surface of the said bearing member.

18. In a bearing, the combination of a base, a flexible annular bearing member and a series of adjustable supports cooperating with said bearing member for equitably distributing the load over the surface of the bearing member.

19. A bearing comprising an annular bearing member composed of a substantially unitary resilient ring with a series of segmental bearing blocks carried thereby; and a series of spaced supports for the said ring.

20. A bearing comprising an annular bearing member composed of a substantially unitary resilient ring with a series of segment bearing blocks attached thereto, a series of spaced supports for the said ring, and means for preventing the rotation of the annular bearing member relative to the supports.

21. A thrust bearing comprising an annular bearing member composed of a substantially unitary resilient ring with segmental bearing portions thereof, and a series of spaced supports arranged to permit the segmental bearing portions to tilt, both radially and tangentially, independently of each other.

22. A bearing comprising a relatively rigid member having a bearing surface, a relatively flexible member having a cooperating bearing surface, and spaced relatively-rigid means for supporting said flexible member.

23. A bearing comprising a relatively rigid member having a bearing surface, a relatively flexible member having a cooperating bearing surface, and spaced relatively-rigid means for supporting said flexible member, at least one of said bearing members having passages through which oil may be delivered to said bearing surfaces.

24. A bearing comprising relatively movable bearing members in contact with one another and receiving the bearing pressure one from the other, one of said members comprising an annular flexible member having a bearing surface divided into a plurality of segmental bearing portions flexibly connected by said member, and relatively rigid supporting means associated with said flexible bearing member, said flexible bearing member cooperating with said supporting means to automatically transfer excess pressure on any portion of said member to other portions thereof.

25. A bearing comprising a relatively rigid member having a bearing surface, an annular, relatively-flexible member having segmental bearing portions flexibly connected by said member, and relatively rigid means for supporting said flexible member whereby said member may yield under the wedging action of the oil between said segmental bearing portions and said bearing surface when the bearing is in operation.

26. A bearing comprising a relatively rigid member having a bearing surface, an annular, relatively-flexible member having a bearing surface divided into relatively-rigid segmental bearing portions flexibly connected by said member, and means adapted to support said bearing portions and permit said member to flex circumferentially under the wedging action of the oil films between said segmental bearing portions and said bearing surface when the bearing is in operation.

27. A bearing comprising an annular flexible member having a bearing surface divided into segments flexibly connected by said member, and adjustable supporting means cooperating therewith to permit said segments to tilt when the bearing is in operation.

28. A thrust bearing comprising relatively rotatable members, an annular flexible member having a bearing surface divided into a plurality of radial bearing segments flexibly connected by said flexible member and positioned between said first-named members, and spaced relatively-rigid means associated with one of said first-named members for permitting the circumferential flexing of sections of said flexible member and equitably distributing the load on the bearing segments.

29. A thrust bearing comprising a relatively stationary member, an annular flexible member having its bearing surface divided into a plurality of radial bearing segments which are associated with said stationary member and flexibly connected by said flexible member to permit circumferential flexing of the sections thereof, a relatively rotatable member arranged to make bearing contact with the bearing segments, and interposed adjustable means between the relatively stationary member and the bearing segments for equitably distributing the bearing pressures exerted upon said segments.

30. A thrust bearing comprising relatively rotatable members, an annular flexible member having a bearing surface divided into relatively rigid radial segments flexibly connected by said flexible member and interposed between said first-named members, and spaced means whereby said segments are tiltably mounted on one of said first-named members.

31. In a bearing, the combination of a bearing member comprising a plurality of spaced relatively-rigid portions constituting a series of segmental bearing portions with interposed resilient connecting portions, and a series of spaced supports adapted to permit of the elastic yielding of the resilient connecting portions.

32. A bearing including a unitary bearing member comprising a plurality of relatively rigid bearing segments and flexible connections between said segments, and means for mounting said segments to tilt circumferentially.

33. A bearing including a unitary bearing member comprising a plurality of relatively-rigid bearing segments and flexible connections between said segments, and a plurality of spaced supports distributed circumferentially of said member.

34. A bearing including a unitary bearing member comprising a plurality of relatively-rigid bearing segments and flexible connections between said segments, and means for mounting said segments to tilt both radially and circumferentially of the axis of the bearing.

35. A bearing including a flexible bearing member and spaced relatively-rigid supports therefor on which said bearing member may tilt.

36. A bearing including a flexible bearing member and a plurality of adjustable supports on which said flexible bearing member is mounted.

37. A bearing including a flexible bearing member having its bearing surface divided into a plurality of bearing segments, and a plurality of adjustable supports for said member operable to equitably distribute the pressure among said segments.

38. A bearing including a flexible bearing member having its bearing surface divided into a plurality of bearing segments, and a plurality of supports corresponding in number to said segments for said flexible bearing member.

39. A bearing including a plurality of bearing shoes, a resilient ring on which said shoes are mounted, means spacing the body of said shoes from said ring, and means on which said ring is mounted.

40. A bearing including a plurality of bearing shoes, a resilient ring on which said shoes are mounted, means spacing the body of said shoes from said ring, and spaced supports on which said ring is mounted to flex.

41. A bearing including a flexible bearing member and a relatively-rigid annularly-arranged support on which said member is mounted to flex.

42. A bearing including a flexible bearing member and a series of annularly-arranged relatively-rigid spaced supports on which said member is mounted to flex.

43. A bearing including a flexible bearing member having its bearing surface divided into a plurality of bearing segments, and annularly-arranged relatively-rigid supporting means on which said member is flexibly mounted.

In witness whereof we have hereunto set our hands this 30th day of March, 1916.

ALBERT KINGSBURY.
HARRY A. S. HOWARTH.